US008308940B2

(12) United States Patent
Granick et al.

(10) Patent No.: US 8,308,940 B2
(45) Date of Patent: Nov. 13, 2012

(54) CHROMATOGRAPHY DEVICES AND METHODS

(75) Inventors: Steve Granick, Champaign, IL (US); Liang Hong, Midland, MI (US)

(73) Assignee: The Board of Trustees of the University of Illinois, Urbana, IL (US)

(*) Notice: Subject to any disclaimer, the term of this patent is extended or adjusted under 35 U.S.C. 154(b) by 992 days.

(21) Appl. No.: 12/274,588

(22) Filed: Nov. 20, 2008

(65) Prior Publication Data

US 2012/0248020 A1 Oct. 4, 2012

Related U.S. Application Data

(60) Provisional application No. 60/992,786, filed on Dec. 6, 2007.

(51) Int. Cl.
*B01D 15/08* (2006.01)

(52) U.S. Cl. .................. 210/198.2; 210/502.1; 210/635; 210/656; 502/401

(58) Field of Classification Search .................. 210/635, 210/656, 659, 198.2, 502.1; 502/401
See application file for complete search history.

(56) References Cited

U.S. PATENT DOCUMENTS 4,160,728 A * 7/1979 Kirkland et al. .............. 210/656
4,298,500 A 11/1981 Abbott
4,544,485 A * 10/1985 Pinkerton et al. .......... 210/502.1
4,737,292 A 4/1988 Ritacco et al.
4,767,670 A 8/1988 Cox et al.
4,778,600 A 10/1988 Williams
4,782,040 A * 11/1988 Revis et al. ................... 502/401
5,071,547 A 12/1991 Cazer et al.
5,110,784 A 5/1992 Williams et al.
5,277,813 A * 1/1994 Feibush et al. ............. 210/502.1
5,316,680 A 5/1994 Frechet et al.
5,559,039 A 9/1996 Williams
5,651,885 A 7/1997 Schick
5,728,457 A * 3/1998 Frechet et al. ............. 428/310.5
5,993,653 A 11/1999 Ahmed et al.
6,270,970 B1 8/2001 Smith et al.
6,482,867 B1 * 11/2002 Kimura et al. ................ 521/149
6,500,671 B2 12/2002 Hage et al.
6,635,174 B1 * 10/2003 Berg et al. .................. 210/198.2
6,923,907 B2 8/2005 Hobbs et al.
7,125,488 B2 * 10/2006 Li ............................. 210/198.2
7,238,426 B2 7/2007 Jiang et al.
7,261,812 B1 8/2007 Karp et al.
7,875,654 B2 * 1/2011 Hong et al. ...................... 516/22
2008/0234394 A1 * 9/2008 Hong et al. ...................... 516/22
2010/0305219 A1 * 12/2010 Granick et al. ............... 516/111

OTHER PUBLICATIONS

De Michele, Cristiano, "Dynamics in the Presence of Attractive Patchy Interactions", J. Phys. Chem. B, 2006, 8064-8079.
Hong, Liang, "Clusters of Charged Janus Spheres", Nano Letters, vol. 6, No. 11, 2006, 2510-2514.
Zheng, Zhenli et al., "Self-Assembly of Patchy Particles", Nano Letters, vol. 4, No. 8, 2004, 1407-1413.

* cited by examiner

*Primary Examiner* — Ernest G Therkorn
(74) *Attorney, Agent, or Firm* — Blanchard & Associates

(57) ABSTRACT

Provided are chromatography devices having a stationary phase that includes patchy particles having at least two different surface chemistries, such as Janus particles. Also provided are methods of separating at least one analyte out of a sample, where the method includes adding a sample having at least one analyte to a chromatography device that includes a stationary phase that includes a plurality of patchy particles. Further provided are methods that include packing a chromatography column with a plurality patchy particles having at least two different surface chemistries. Additional embodiments are disclosed.

21 Claims, 11 Drawing Sheets

(A)

(B)

(A)

(B)

(A)

(B)

CHROMATOGRAPHY DEVICES AND METHODS

CROSS REFERENCE TO RELATED APPLICATION

This application claims the benefit of U.S. Provisional Application No. 60/992,786, the contents of which are incorporated herein by reference.

STATEMENT AS TO FEDERALLY SPONSORED RESEARCH

This subject matter of this application was funded in part under Federal research grant DEFG02-02ER46019 awarded by DOE. The U.S. Government may have certain rights in this invention.

FIELD

The present disclosure relates generally to chromatography devices having a stationary phase that includes a plurality of patchy particles, which each have a plurality of surfaces having different surface chemistries. The surface chemistries may differ for example, by virtue of one or more of them being modified for example, by radiation, or by coatings or other chemical modifications. The disclosure also relates to methods of making such chromatography devices by packing a chromatography column with a plurality of patchy particles. The disclosure further relates to using such chromatography devices to separate at least one analyte out of a sample.

BACKGROUND

High performance liquid chromatography (HPLC) is a very popular separation technique in analytical sciences. Additional information about HPLC can be found e.g., in "HPLC:Practical and Industrial Applications" by Joel K. Swadesh, 2nd ed., CRC Press Boca Raton, Fla. 2000; "Advances in Chromatography" by Eli Grushka and Nely Grinberg, 1st ed., CRC Press, Boca Raton, Fla., 2007); each of these references, is incorporated herein by reference.

Manufacturing HPLC instruments and accessories is a two billion dollars plus business annually and impacts many industries, including pharmaceutical, chemical, food, and environmental markets. Traditionally, based on the properties of the analytes to be separated from a sample, different types of HPLC can be applied; for example, reversed-phase liquid chromatography for analytes with hydrophobic groups, especially neutral or non-ionized compounds; and normal-phase liquid chromatography for polar compounds.

A limitation of current technology is that for unknown mixtures or complex samples containing compounds of different chemical properties in terms of hydrophobicity, polarity, and ionizability, one single type of HPLC may not be sufficient to resolve all the compounds. There are currently two possible solutions in the market for the separation of complex mixtures, such as separation of various metabolites from a mixture, e.g., to be able to analyze the metabolites individually and understand the metabolism.

One approach is two or multi-dimensional separation, in which more than one separation mechanism is employed. This method requires e.g., two or more columns to be utilized together or coupled, each separating a different compound or analyte from a sample. This method results in more instrumentation, more time in analysis, and considerably more expense.

Another approach lies in the improvement of the liquid chromatography (LC) columns. Scientists have tried to embed polar groups in the stationary phase of reversed-phased columns and by this method combine two separation mechanisms within one column. These are commercially available and have become quite popular since their introduction. However, as these existing methods rely on special chemical modifications they lack flexibility, and their efficiency is still under debate.

Effective separation of complex mixtures is a problem, the solution for which could have considerable commercial impact.

BRIEF DESCRIPTION OF THE DRAWINGS

Illustrative embodiments of the present disclosure are herein described, by way of non-limiting example, with reference to the following accompanying Figures.

DETAILED DESCRIPTION

Figure 1:
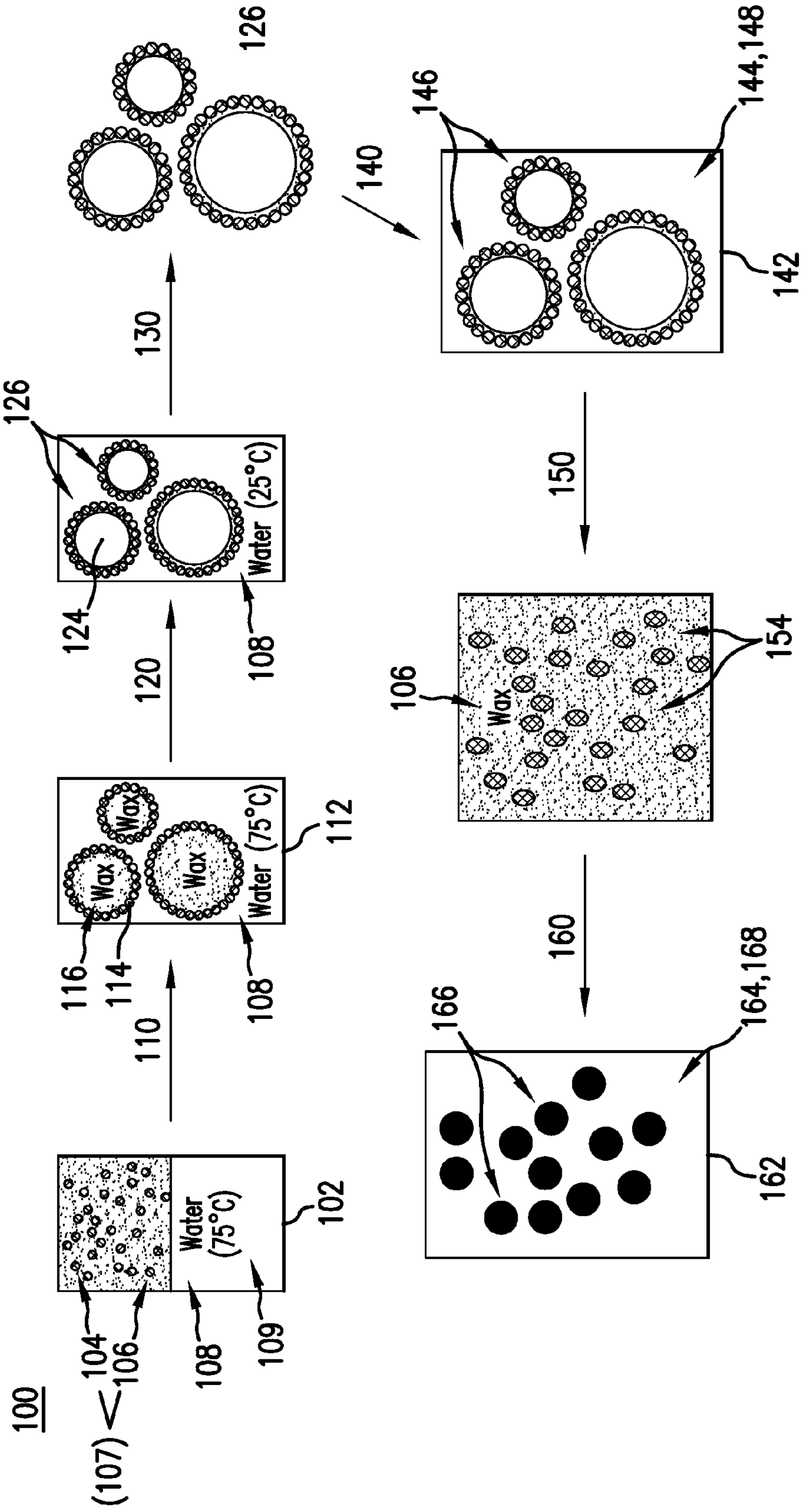
FIG. 1 depicts a schematic of an example procedure to create patchy particles in accordance with non-limiting example embodiments of the present disclosure, in this case the patchy particles being Janus particles.

Illustrative embodiments of the present disclosure include chromatography devices that include a stationary phase, which stationary phase includes a plurality of patchy particles, such as Janus particles. The patchy particles include at least two surfaces having at least two different surface chemistries. By way of non-limiting example, the present disclosure proposes the use of Janus particles having different surface chemistries on at least two hemispheres, or on two otherwise-determined portions of spherical particles or particles of other shape—as the stationary phase for HPLC and other chromatographic separation methods.

Other illustrative embodiments include methods of separating at least one chemical compound or analyte from a sample. Such methods include adding a sample that includes at least one analyte to a chromatography device and allowing at least a portion of the analyte to separate from the sample as the sample passes through the stationary phase of the chromatography device. The stationary phase of the chromatography device in these methods includes a plurality of patchy particles, such as Janus particles, having at least two surfaces, where the surfaces have different surface chemistries. Reactions may be performed on the analytes to improve separation capability. Example embodiments may include separating at least one analyte from the patchy particles. For example, one or more solvents with different properties (e.g., polarity) may be used with HPLC or other forms of chromatography, to rinse small molecules from particles surfaces (desorption process). Alternatively, one may remove patchy particles from the device and separate an analyte from the patchy particles.

Further illustrative embodiments include packing a chromatography column with a plurality of patchy particles, where the patchy particles include a plurality of surfaces (such as at least a first surface and a second surface), where the surfaces have different surface chemistries.

The existence of two or more surface chemistries on the same particles enables one to bring two or even more than two separation mechanisms to the same column, thus negating the need to bring two or multiple columns into sequential use. In simple molecule separation applications, separation efficiency may be increased further by the present devices and methods because the particle surfaces have direct contact with an analyte. Thus, the need for separate columns for separation of two or more analytes, such as hydrophilic and hydrophobic analytes, may be obviated. However, systems including more than one column are not excluded herefrom when such systems use patchy particles as part of at least one column, in accordance with example embodiments.

The aspects, advantages and/or other features of example embodiments of the present disclosure will become apparent in view of the following detailed description, taken in conjunction with the accompanying drawings. It should be apparent to those skilled in the art that the described embodiments of the present disclosure provided herein are merely exemplary and illustrative and not limiting. Numerous embodiments of modifications thereof are contemplated as falling within the scope of the present disclosure and equivalents thereto. All publications, patent applications, patents, and other references mentioned herein are incorporated by reference in their entirety.

In describing example embodiments, specific terminology is employed for the sake of clarity. However, the embodiments are not intended to be limited to this specific terminology.

DEFINITIONS

As used herein, "a" or "an" may mean one or more. As used herein, "another" may mean at least a second or more.

The term "colloidosome" refers to a colloidal-sized droplet of a first liquid in a second liquid having particles at the interface formed between the first liquid and a second liquid. A solidified colloidosome, in which the first liquid has solidified, is a colloidal-sized particle having particles on its surface.

The term "emulsion" refers to a combination of at least two liquids, where one of the liquids is present in the form of droplets in the other liquid. IUPAC, *Compendium of Chemical Terminology: IUPAC Recommendations,* 2$^{nd}$ ed., compiled by A. D. McNaught and A. Wilkinson, Blackwell, Oxford (1997). The term "emulsion" is intended to cover both water/oil emulsions—water droplets in oil, as well as oil/water emulsions—oil droplets in water.

The term "Janus angle" refers to the three-phase contact angle formed between a particle and the liquid-liquid interface formed between a first liquid and a second liquid. The term "Janus balance" refers to the percentage of the total contiguous surface area of a particle that contacts a first liquid in a liquid-liquid interface composed of a first liquid and a second liquid. For example, a Janus balance of 25% refers to a particle having 25% of the surface area of the particle in contact with a first liquid and the remaining 75% of the surface area of the particle exposed.

The term "patchy particles" refers to particles having at least two different surface chemistries. Generally speaking, patchy particles correspond to particles with discrete and attractive interaction sites—"patches"—at prescribed locations on the particle surface. Additional information on patchy particles can be found for example, in Zhenli Zheng and Sharon C. Glotzer, Nano Letters 4(8):1407-1413, 2004; and DeMichele et al., J. Phys. Chem. B. 110(15):8064-8079, 2006, which are incorporated herein by reference. The different surface chemistries may be for example on two hemispheres, or on two or more otherwise-determined portions of spherical particles or particles of other shape. By "hemisphere", applicants are referring to essentially one half of an essentially spherical particle, but as discussed further herein, other embodiments are encompassed, which may include particles having three or more surfaces or portions of particles, as well as particles having non-spherical shapes.

Patchy particles may include, but are not limited to, Janus particles. It will be appreciated by one of ordinary skill in the art that while Janus particles are described in certain example embodiments herein, other particle structures such as patchy particles with two or more surfaces of varying chemistry can be used in place of Janus particles. Thus, when Janus particles are referred to herein, such references are intended to be examples, and are not intended to limit the scope of possible embodiments. The term "surface modifying agent" means any chemical reagent that can change the chemical functionality of a surface.

Example embodiments are directed to chromatography devices that include a stationary phase, which stationary phase includes a plurality of patchy particles. The patchy particles include a plurality of surfaces (e.g., at least a first surface and a second surface), in which each surface has a different chemistry, (e.g., the first surface has a different surface chemistry than the second surface).

According to example embodiments, the chromatography device is capable of at least one chromatographic separation method including, but not limited to, normal phase liquid chromatography, reverse phase liquid chromatography, ion exchange chromatography, size exclusion, and affinity chromatography. Non-limiting example chromatography devices may include a high performance liquid chromatography device (HPLC).

Patchy particle surface chemistries may be different for example by at least a first surface of the patchy particles being modified, while at least a second surface is either modified differently than the first surface, or unmodified. Patchy particles may include two different surface chemistries (such as Janus particles) or third, fourth or more surfaces having different surface chemistries. Thus, example embodiments may include patchy particles (such as Janus particles) having a third, fourth or more surfaces with different surface chemistries.

According to example embodiments, a particle surface may be modified by adding one or more coatings to at least one surface. The term "coating" is intended to include a substance over and attached to at least a portion of the patchy particle. "Coating" does not necessarily mean that the substance is applied by any particular coating technique, nor does it mean that the substance covers a particular amount or part of the surface.

At least one of the patchy particle surface chemistries may be hydrophobic, for example by including at least one hydrophobic substance as a coating on patchy particles. Coatings may include, for example coatings that include one or more suitable organic groups, such as alkyls, a phenyl group, —CN, and/or —$NH_2$. Example alkyls may include, but are not limited to $C_4$ to $C_{18}$ alkyl chains, such as $C_4$, $C_8$ or $C_{18}$ alkyl chains.

At least one of the patchy particle surface chemistries may be hydrophilic, for example by including a hydrophilic substance as a coating on patchy particles, or by not modifying the patchy particle surface. Thus, example patchy particles may include at least a hydrophobic first surface and a hydrophilic second surface. According to non-limiting example embodiments, the patchy particles may include a hydrophobic first surface of a coating of at least one alkyl chain, such as a $C_4$, $C_8$ or $C_{18}$ alkyl chain, and a hydrophilic second surface has no coating.

Embodiments where patchy particles include at least a hydrophobic first surface and a hydrophilic second surface may be useful for example, in embodiments where at least one analyte is hydrophobic and at least one analyte is hydrophilic. As a further example, different degrees of hydrophilicity and hydrophobicity can also be separated by particles that selectively adsorb one analyte of this type on one side, and a chemically-different analyte on a second side. This can improve dramatically the efficiency of the separation of complex mixtures. For example, in an HPLC approach, according to non-limiting example embodiments, the normal phase and reversed phase can be brought together without special chemical synthesis by coating one hemisphere of silica particles with $C_8$ or $C_{18}$ alkyl chains while leaving the other hemisphere untouched.

Non-limiting example embodiments may include a chromatography device that includes a stationary phase having plurality of silica Janus particles, where the silica Janus particles include at least a hydrophobic first surface coated with at least one alkyl chain, and a hydrophilic second surface having no coating thereon.

According to further non-limiting example embodiments, the patchy particles may include a first surface that includes positively charged 3-aminopropyltriethoxysilane (APS) and said second surface that includes non-polar octadecyltrichlorosilane (OTS)

According to other example embodiments, particle surface modifications may be made by applying electromagnetic radiation to at least one surface of the patchy particle, such as radiation in the infrared, ultraviolet, and visible wavelength ranges. Accordingly, modified particle surfaces may be a result of applying electromagnetic radiation to a first and/or second surface of a patchy particle. Optionally, the surfaces of particles may also contain reactive moieties that are responsive to electromagnetic radiation of specific wavelengths, thereby permitting further modification following irradiation.

Patchy particles may be formed from any suitable composition(s) known to those skilled in the art. By way of non-limiting example, patchy particles may be formed from at least one material selected from polymers (for example, polystyrene, polypropylene, latex, polyacrylamide), polypeptides, proteins, nucleic acids, glass (for example, fused silica), ceramics (for example, $TiO_2$, $Al_2O_3$, $ZrO_2$), metals (for example, gold, silver, platinum, palladium or alloys), and chemical elements (for example, tungsten, titanium, carbon, etc.). By way of non-limiting example, the patchy particles may be formed from silica, fused silica, or polymeric particles. Thus, it will be appreciated by one of ordinary skill in the art that suitable surface modifications may include for example, coatings of polymers, polypeptides, proteins, nucleic acids, glass, ceramics, metals, and chemical elements that may be applied to patchy particles for HPLC applications Other possible surface modifiers for patchy particles may include fluorescent agents, surfactants, drugs, dyes, pigments, Plasmon resonant materials, and lipids As indicated above, patchy particles in accordance herewith may include spherical particles, but are not limited to spherical particles. Patchy particles in accordance with example embodiments may include particles having at least one shape such as spherical, ellipsoid, helical, rodlike, oblate and other particle shapes that may be apparent to those skilled in the art. These shapes need not be exact, and the terms "spherical," "ellipsoid," "helical," "rodlike," and "oblate" are intended to include particles that are substantially spherical, substantially ellipsoid, substantially helical, and the like. The devices and methods disclosed herein also provide for optimized packing such as for example, in columns having particles with larger domain sizes. That is particles of various sizes and shapes may be used together to optimize packing of a chromatography column. Examples of efficient mixing induced by the Janus geometry can be found for example, in Liang Hong, Angelo Cacciuto, Erik Luijten, and Steve Granick, "CLUSTERS OF CHARGED JANUS SPHERES," *Nano Letters* 6, 2510 (2006), which is incorporated herein by reference in its entirety. Mixing of particles with homogeneous chemical makeup is less efficient.

The composition, shape, size, and surface chemistry of patchy particles used herein, may be selected by those skilled in the art based on various factors, such as the availability of various particles, ease and cost of particle fabrication, the composition of one or more analytes to be separated from samples, desired stability, etc. . . . Example patchy particles may be solid or substantially solid, or at least partially hollow. Patchy particles that may be used herein may be, but are not necessarily, colloidal-sized particles.

Other non-limiting example embodiments are directed to methods that include adding a sample having at least one analyte to a chromatography device; and allowing at least a portion of the at least one analyte to separate from the sample as the sample passes through a stationary phase of the chromatography device, where the stationary phase includes a plurality of patchy particles having at least a first surface and a second surface, the first surface having a different surface chemistry than the second surface. According to non-limiting examples, the patchy particles may include Janus particles as discussed herein and/or they may include patchy particles having more than two different surface chemistries. Such example methods may further include analyzing the separation of the at least one analyte from the sample.

Example embodiments may further include removing one or more analytes from the patchy particles (e.g., using one or more solvents).

Non-limiting example embodiments are also directed to methods that include packing a chromatography column with a plurality of patchy particles, said patchy particles comprising at least a first surface and a second surface, the first surface having a different surface chemistry than the second surface.

In the present methods, the chromatography devices, patchy particles, surfaces and other aspects of the methods may be as described herein with respect to the chromatography devices themselves.

It is contemplated that the devices and methods herein may include more than one different type of patchy particles. For example, a single chromatography device may include a first type of patchy particle that has two surfaces having two or more different surface chemistries, and a second type of patchy particle having two or more surfaces (which surfaces may be each completely different from, or some surfaces may be similar to the surfaces of the first type of patchy particle).

Patchy particles in accordance herewith may be formed by various methods including methods known to those skilled in the art and methods described e.g., in U.S. patent application Ser. No. 11/690,671, filed Mar. 23, 2007, by Granick et al., entitled, "SYSTEM FOR FORMING JANUS PARTICLES", which is incorporated herein by reference in its entirety. As described in that application, an emulsion method may be used to synthesize Janus particles in large quantity. Using simple and cost-effective methods, large quantities of packing materials can be produced in short times. This concept could significantly save time for separation method development, which means broader application for liquid chromatography, and potentially billions of dollars per year for pharmaceutical and related companies.

In particular, according to example embodiments, colloidosomes form an emulsion containing particles, a first liquid, a second liquid, and optionally, a surfactant. The particles localize at the liquid-liquid interface of the colloidosome, and solidification of the first liquid forms a solidified colloidosome. The inclusion of a surfactant may permit control over the percentage of the surface area of the particles within the first liquid, thereby enabling control of the Janus balance of the final Janus particles obtained. The exposed surfaces of the immobilized particles are modified chemically by treating the solidified colloidosome with a surface modifying agent. The solid is removed from the solidified colloidosome to release the Janus particles. The previously blocked surfaces of the Janus particles are now accessible for optional subsequent chemical modification. Gram-sized quantities of Janus particles can be synthesized.

According to non-limiting examples, patchy particles, such as Janus particles may be formed by a method that includes forming an emulsion that contains initial particles, a first liquid, and a second liquid; solidifying the first liquid to form a solid that contains at least a portion of the initial particles on a surface of the solid; and treating the exposed particle sides with a first surface modifying agent, to form the Janus particles. Each of the initial particles on the surface has an exposed particle side and a blocked particle side.

According to non-limiting examples, patchy particles, such as Janus particles may be formed by a method that includes forming an emulsion that contains initial particles, a first liquid, a second liquid, and a surfactant; solidifying the first liquid to form a solid that contains at least a portion of the initial particles on a surface of the solid; and treating the exposed particle sides with a first surface modifying agent, to form the Janus particles. Each of the initial particles on the surface has an exposed particle side and a blocked particle side.

FIG. 1 represents a non-limiting example of a process 100 for forming Janus particles. Process 100 includes processes 110, 120, and 140. Process 100 further includes processes 130, 150, and optionally, 160.

In FIG. 1, a mixture 102 is prepared that includes particles 104, a first liquid 106, a second liquid 108, and optionally, a surfactant 109. Optionally, the particles 104 and the first liquid 106 are combined initially to form mixture 107, which is subsequently combined with the second liquid 108 to provide the mixture 102.

The particles 104 include microparticles and nanoparticles. Example particles 104 include microparticles having a diameter greater than 100 nm, including 105 nm to 10 μm, such as 105, 150, 200, 300, 500, 600, 700, 800, and 900 nm and 1, 1.5, 2.0, 2.5, 5, 7.5, and 10 μm. An example particle 104 is a microparticle having a diameter of 800 nm to 5 μm, including 1.0, 1.5, 2.0, 2.5, 3.0, 3.5, 4.0, and 4.5 μm. Example particles 104 include nanoparticles having a diameter of 100 nm or less, including the range of 10 nm to 100 nm, such as 10, 20, 30, 40, 50, 60, 70, 80, 90, and 100 nm.

According to non-limiting examples, the particles 104 may be prepared by modifying precursor particles to possess modified surfaces bearing chemically reactive moieties. For example, precursor particles may be chemically modified to form particles 104 before their introduction into mixture 102 or optionally, mixture 107. Examples of modification include alkylation, amidation, esterification, metallation, phosphorylation, sulfonation, oxidation, reduction, and covalent attachment of additional chemical moieties that impart further chemical functionality to a precursor particle, among others. Non-limiting example surface modifiers can include metals, fluorescent agents, surfactants, drugs, dyes, pigments, plasmon resonant materials, proteins, lipid layers, and polymers.

The first liquid 106 and the second liquid 108 of mixture 102 may be selected such that the overall surface energy of the liquid-liquid interface 114 is lowered upon addition and subsequent adsorption of particles 104 in formation of the emulsion 112 in process 110. The first liquid 106 may include any organic polymer that undergoes that undergoes reversible melting.

Examples of first liquids 106 include polymers and waxes. Waxes are water insoluble, organic materials that are solid or semi-solid at room temperature, usually of lower density than water, and typically can be melted above room temperature to form a liquid. Example waxes may include any naturally occurring and synthetic waxes, wax esters, and greases that have a melting temperature of 30° C. or more, with a melting range of less than 10° C., and that are non-reactive with the reagents or solvents to which they are exposed.

Examples of first liquids 106 may include esters of various long-chain (fatty) alcohols and long-chain acids, where at least one member of the ester may have 10 or more carbon atoms, including various unsaturated and branched chain types and also those esters of glycerols and sterols. Also, certain free alcohols or acids have wax-like properties of melting temperature and inertness. Examples of saturated fatty acids include capric, lauric, myristic, palmitic, margaric, stearic, arachidic, behenic, tetracosanic, lignoceric, cerotic, and melissic. Examples of unsaturated fatty acids include tiglic, hypogaeic, gaidic, physetoleic, elaidic, oleic, isooleic, erudic, brassidic, and isoerudic. Examples of fatly alcohols include octadecyl, carnaubyl, ceryl, melissyl, and phytol.

Also included are various esters of these and other fatty acids with any suitable fatty alcohols, or sterols such as cholesterol, or glycerols.

Examples of first liquids 106 may include natural or suitably modified waxes such as various plant derived waxes, greases and oils including carnauba wax, cranberry wax, ouricuri wax, candelilla wax, raphia wax, apple, cotton and cactus waxes; waxes (including greases) produced by bacteria (for example, cetyl stearate); fungi, protozoa and algae; various invertebrate waxes and greases including insect waxes such as beeswaxes (for example, triacontyl palmitate, palmatyl palmitate), and *Coccus* sp. derived waxes (for example, lac, cochineal and Chinese insect); and other animal fats (for example, triglycerides) and waxes including spermaceti (for example, cetyl palmitate), lanolin and wool grease. Also included are various derivatives, extracts, and combinations of these materials.

Examples of first liquids 106 include many natural or synthetic hydrocarbons such as white waxes, paraffins, ceresins, silicon greases and waxes, polychlorinated or polyfluorinated hydrocarbons, aromatic hydrocarbons (such as naphthalene and durene (1,2,4,5-tetramethylbenzene)), polyether waxes and polyester waxes. Waxes include waxy polymers, which are polymers that have wax-like chemical or physical properties alone or when combined with other waxes. Examples of waxy polymers include polyethylenes and polypropylenes. Examples of polymers that may be combined with waxes to produce waxy polymers include certain gums and rubbers, various kinds of latex, gutta-percha, balata, chicle and various derivatives. Also included are synthetic rubbers such as isoprene polymers, hydrogenated rubber, butadiene polymers, chloroprene polymers and butyl polymers.

Examples of first liquids 106 also include gelatin, guar gum, acacia (gum arabic), carob bean gum, carrageenan, xanthan gum, food starch, carboxymethyl cellulose, ethyl cellulose, methyl cellulose, cellulose acetate, cellulose nitrate, silicone rubber, butyl rubber, butadiene-styrene rubber, polyurethane, epoxy, polyvinyl alcohol, polyvinyl acetate, polydimethyl siloxane, urea formaldehyde, polyethylene, polyethylene glycol, polystyrene, polymethyl methacrylate, polypropylene, polyvinyl chloride, polyvinyl alcohol, polycarbonate, and polyamide. An especially preferred first liquid 106 is paraffin wax.

The solidification of the first liquid 106 may be induced in a variety of ways. Examples include a temperature change (for example, heating or cooling about the melting temperature), a photochemical process (for example, photopolymerization or photodepolymerization), and a chemical process (for example, a catalyst, an initiator, or inclusion or removal of a co-solvent). When the first liquid 106 is a wax, it is preferred to induce the solidification of first liquid 106 by lowering the temperature (for example, past a temperature about the melting temperature of the wax) or by removing a co-solvent (for example, a solvent that liquefies the wax).

The second liquid 108 includes any liquid that is immiscible with the first liquid 106 and does not solidify under the same conditions as the first liquid 106. A preferred second liquid 108 is water, particularly where the first liquid 106 is a wax. An example combination of the first and second liquids 106 and 108 is paraffin wax and water, respectively.

Example surfactants 109 include any surfactant that is soluble in the second liquid 108, such as an ionic surfactant or a non-ionic surfactant. Examples of ionic surfactants include cationic surfactants (for example, cetyltrimethyl-ammonium bromide (CTAB), hexadecyltrimethylammonium bromide (HTAB), dimethyldioctadecylammonium bromide (DDAB), and methylbenzethonium chloride (Hyamine™)) and anionic surfactants (for example, sodium dodecyl sulfate, sodium lauryl sulfate, lauryl dimethyl amine oxide, bile salts (such as sodium deoxycholate, sodium cholate)). Examples of non-ionic surfactants include polysorbates (Tween™), polyethoxylated alcohols, polyoxyethylene sorbitan, octoxynol (Triton X100™), N,N-dimethyldodecyl-amine-N-oxide, Polyoxyl 10 lauryl ether, Brij 721™, nonylphenol ethoxylate (Tergitol™), cyclodextrins, lecithin, among others. A preferred non-ionic surfactant is Tween 20. An example ionic surfactant is a cationic surfactant, such as DDAB.

The type of surfactant 109 selected for inclusion in process 100 depends upon the type of particle 104 that is selected for the mixture 102. For particles 104 having an ionic surface or coating, a surfactant 109 having an ionic character opposite that of the particles 104 may be selected. For example, a cationic surfactant, such as DDAB, may be used 109 for particles 104 having an anionic surface, such as fused silica microspheres. For particles that have a mixed ionic surface composition (that is, containing both positive and negative charges), an example surfactant may include a mixture of ionic surfactants, or alternatively, a non-ionic surfactant.

When surfactant 109 is an ionic surfactant, the amount of the surfactant 109 in the mixture 102 corresponds to a mass of the surfactant 109 of 10 parts per million (ppm) to 90 ppm of the mass of the second liquid 108, including 10, 15, 20, 25, 30, 35, 40, 45, 50, 55, 60, 65, 79, 75, 80, 85, and 90 ppm of the mass of the second liquid 108, as well as other amounts within that range. An example amount of the surfactant 109 in mixture 102 corresponds to a mass of the surfactant 109 of 20 to 60 ppm of the mass of the second liquid 108, such as 20 ppm. For example, if 10 g of the second liquid 108 is present in the mixture 102, then an example amount of surfactant 109 in mixture 102 corresponds to 200 μg of surfactant 109.

When surfactant 109 is a non-ionic surfactant, an example amount of surfactant 109 in the mixture 102 corresponds to a mass of the surfactant 109 of 20 parts per million (ppm) to 1000 ppm of the mass of the second liquid 108, including 20, 50, 100, 200, 300, 500, 600, 700, 800, 900, and 1000 ppm of the mass of the second liquid 108, as well as other amounts within that range. An example amount of the surfactant 109 in mixture 102 corresponds to a mass of the surfactant 109 of 100 to 1000 ppm of the mass of the second liquid 108, such as 500 ppm. For example, if 10 g of the second liquid 108 is present in the mixture 102, then an example amount of surfactant 109 in mixture 102 corresponds to 5 mg of surfactant 109.

The amounts of the particles 104 in the mixture 102 corresponds to a mass of the particles 104 of 0.25% to 35% of the mass of the first liquid 106, including 0.25%, 0.5%, 1%, 5%, 10%, 15%, 20%, 25%, 30%, and 35% of the mass of the first liquid 106, as well as other percentages within that range. An example amount of particles 104 in mixture 102 corresponds to 20% of the mass of the first liquid 106. For example, if 1 g of the first liquid 106 is present in the mixture 102, then an example amount of particles 104 in mixture 102 corresponds to 0.2 g of particles 104.

Example mass ratios of the first liquid 106 to the second liquid 108 of mixture 102 is 1:1 to 1:20, including 1:1, 1:2, 1:3, 1:4, 1:5, 1:6, 1:7, 1:8, 1:9, 1:10, 1:12.5, 1:15, 1:17.5, and 1:20, as well as other ratios within that range. The mass ratio of the first liquid 106 to the second liquid 108 in the mixture 102 may be 1:5, 1:10, and 1:15. A mass ratio of the first liquid 106 to the second liquid 108 may be 1:10. For example, if 10 g of the second liquid 108 is present in the mixture 102, then 1 g of the first liquid 106 may be present in mixture 102.

An example compositional amount of the particles 104, the first liquid 106, the second liquid 108, and optionally the surfactant 109 in the mixture 102 may be determined based upon factors such as the quantity of Janus particle yield desired, the type of modification chemistries to be used, and the desired Janus balance of the resultant Janus particles, among other considerations. Thus, example compositions of mixture 102 include the particles 104 representing $1\times10^{-4}$ to $1.5\times10^{-1}$ of the total mass fraction of mixture 102; the first liquid 106 representing $5\times10^{-2}$ to 0.50 of the total mass fraction of mixture 102; and the second liquid 108 representing 0.42 to 0.95 of the total mass fraction of mixture 102. An example composition of mixture 102 includes 0.2 g of particles 104, 1.0 g of first liquid 106, and 10.0 g of second liquid 108.

An amount of surfactant 109 in the mixture 102 can determine the desired Janus balance for the final Janus particles. Though the amount of surfactant 109 present in the mixture 102 contributes to the overall composition of the mixture 102, the relative amount of surfactant 109 that represents the total mass fraction of mixture 102 may be insignificantly small compared to the other components (for example, the mass fraction of a cationic surfactant would represent $4.2\times10^{-6}$ to $8.8\times10^{-5}$ of the total mass fraction of mixture 102). Thus, the relative contribution of surfactant 109 may be ignored when calculating the amounts of the remaining components (that is, the particles 104, the first liquid 106, and the second liquid 108) required to prepare the mixture 102.

Referring again to FIG. 1, the mixture 102 may be dispersed to form the emulsion 112 in process 110. When the surfactant 109 is added to the mixture 102 before process 110, the composition of the emulsion 112 may be the same as mixture 102. Optionally, the surfactant 109 may be added to the mixture 102 during process 110 to form the emulsion 112. The emulsion 112 may be prepared by any means of dispersing the mixture 102, including sonicating, high pressure jet homogenizing, vortexing, mechanical mixing, magnetic stirring, and the like. An example process 110 is forming the emulsion 112 by magnetic stirring of the mixture 102.

Because emulsion 112 is formed by mixture 102, it does not matter how mixture 102 is prepared initially. While it may be convenient to form a first mixture containing particles 104 with a first liquid 106 and to form a second mixture containing surfactant 109 and a second liquid 108 in route to preparing mixture 102, this is not a requirement.

Figure 2:
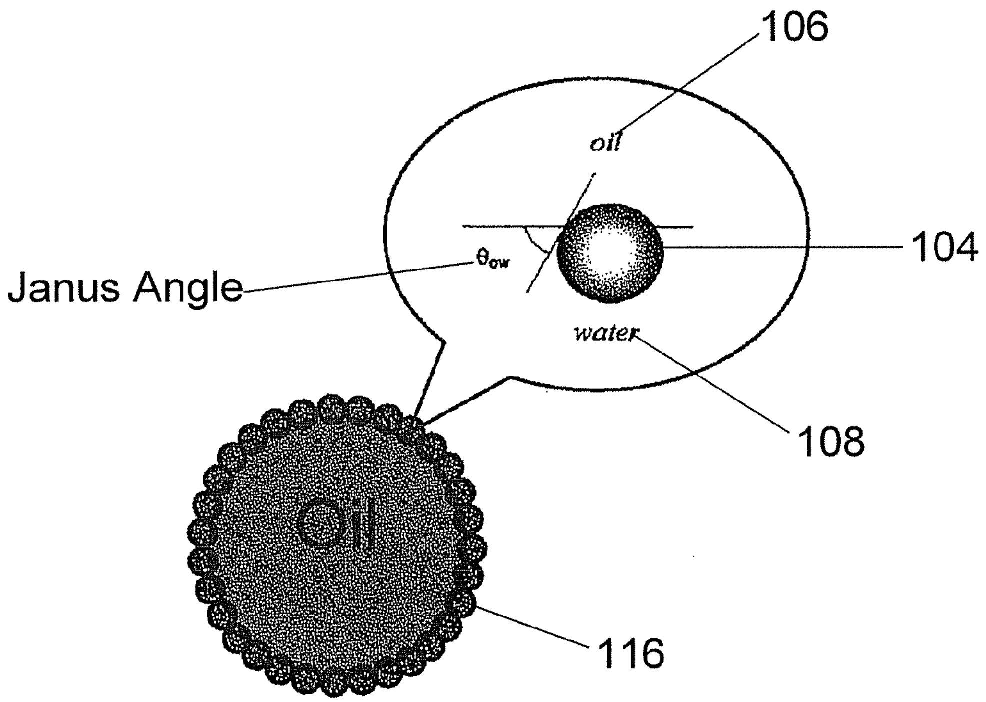
FIG. 2 depicts the Janus angle (depicted as $\theta_{ow}$) for a colloidosome containing a particle, a first liquid (exemplified by oil) and a second liquid (exemplified by water)

The emulsion 112 includes a liquid-liquid interface 114 between the first liquid 106 and the second liquid 108, with particles 104 adsorbed at the liquid-liquid interface 114. The liquid colloidosome 116 of emulsion 112 includes the first liquid 106 as an interior component and particles 104 as exterior components. The Janus angle refers to the three-phase contact angle formed between the particles 104, the first liquid 106, and the second liquid 108 at the interface of the liquid colloidosome 116 with the second liquid 108 (FIG. 2). A Janus angle of 90 degrees would correspond to a particle having 50% of its surface in contact with the liquid 106. A Janus angle of less than 90 degrees (for example, 50 degrees) would correspond to a particle having less than 50% of its surface in contact with the liquid 106. Janus angles for liquid colloidosome 116 range from 40 degrees to 90 degrees, including 40, 45, 50, 55, 60, 65, 70, 75, 80, 85, and 90 degrees. Janus angles for liquid colloidosome 116 range from 45 to 70 degrees, such 50, 55, 60, and 65 degrees.

Referring again to FIG. 1, the first liquid 106 is solidified in process 120 to form the solid colloidosome 126. The solid colloidosome 126 possesses a solid interior 124 composed of the solidified form of the first liquid 106 and particles 104 fixed in place on the surface of the solid. The particles 104 that are associated with the solid colloidosome 126 are partially embedded in the first liquid 106 that forms the surface of solid colloidosome 126 during process 120. Thus, particles 104 of solid colloidosome 126 may have at least two different surfaces: (1) an embedded surface that is not exposed to solvent (that is, a blocked surface) and (2) a surface that is exposed (for example, to the second liquid 108 of emulsion 112).

The Janus balance of the resultant particle is correlated with the Janus angle of colloidosome 116, because the Janus angle reflects the extent to which the surface of the particle 104 contacts the solid interior 124 of the solid colloidosome 126. Janus balances range from 10% to 50%, including 10, 15, 20, 25, 30, 35, 40, 45, and 50%, as well as other percentages within that range. Janus balances may range from 25%-45%, such as 30, 35, and 40%.

In process 130 of FIG. 1, the solid colloidosomes 126 are collected. Suitable methods of collection include any means of separating the solid colloidosomes 426 from the remaining liquefied components of the emulsion 112, including the second liquid 108 and surfactant 109. Example collection methods include filtration, centrifugation, sedimentation, and magnetic separation, with the latter method being useful for particles having magnetic properties. An example collection method is filtration. Optionally, the solid colloidosome 126 may be washed to remove any unbound or weakly-adsorbed particles 104 and surfactants 109. Washing solutions may include water, methanol and ethanol, among others. Methanol may be a washing solution, particularly for removing the surfactant 109 from the solid colloidosome 126. Additional purification steps may be performed to further separate free particles 104 and surfactants 109 from the solid colloidosome 126.

In process 140, the solid colloidosomes 126 are chemically modified on the exposed surfaces of particles 104 to form modified colloidosomes 146. The solid colloidosomes 126 may suspended in solution 142 that includes one or more surface modifying agents 144. The solution 142 includes any liquid that preserves the integrity of the solid colloidosomes 126 and which solvates the surface modifying agents 144. Examples of the solution 142 include aqueous-based solvents like water or water-miscible solvents like polar protic solvents (for example, methanol, ethanol, etc.) or polar aprotic solvents (for example, dimethylformamide, dimethylsulfoxide, pyridine, acetone, etc.).

Optional additional components 148 may be included in the solution 142 of process 140, including buffering agents, acids, bases, salts, chaotropic agents, micellar agents, denaturants, renaturants, and the like.

The surface modifying agents 144 include any reagent suitable for adding chemical functionality to the exposed surface of particles 104 of the solid colloidosomes 126. Examples of the surface modifying agents 144 include alkylating agents, amidating agents, esterification agents, metallation agents, phosphorylating agents, sulfonating agents, oxidizing agents, reducing agents, or other chemistries that can add chemical functionality to the exposed surface of particles 104.

Depending upon the complexity of modifications desired on particles 104 of the solid colloidosomes 126, a plurality of processes 140 may be performed sequentially, with each process 140 specific for adding a particular chemical functionality to the exposed surface of the particles 104. Preferably, the modified colloidosomes 146 are collected after each process 140 is completed. Any suitable collection process may be used for recovering the modified colloidosomes 146, such as those described for process 130. The obtained modified colloidosomes 146 may be extensively washed to remove solution 142, surface modifying agents 144, and any additional components 148.

In process 150, the modified colloidosomes 146 are treated to remove the solid interior 124, releasing the Janus particles 154. The colloidosomes 146 can be treated in a variety of ways to remove solid interior 124, such as by using a solvent to dissolve the solid interior 124 or by using heat to melt the solid interior 124. Preferably, the Janus particles 154 do not dissolve or react with a solvent used to dissolve the solid interior 124. The Janus particles 154 do not melt at the elevated temperature required to melt the solid interior 124. For colloidosomes 146 that include paraffin wax as the solid interior 124, process 150 includes treating the colloidosomes with a solvent, such as chloroform. The Janus particles 154 are subjected to collection using any separation and purification method available, including those described for process 130.

In process 160, the Janus particles 154 may be subjected to additional modification using chemistries to modify the second, previously blocked, side of the particles 104 to form modified Janus particles 166. The Janus particles 154 are suspended in a solution 162 that includes one or more surface modifying agents 164 and optional additional components 168. Additional components 168 may include those that are described as optional additional components 148 of process 140. Solution 162 includes any liquid that preserves the integrity of the Janus particles 154 and which solvates the surface modifying agents 164. The range of modification chemistries possible in process 160 may be greater than those possible in process 140, because preserving the integrity of the solid colloidosome 126 is no longer a consideration. Consequently, process 160 may include a broader range of solutions 162 than possible for solutions 142 of process 140, including both aqueous and organic solvents, as well as a broader range of surface modifying agents 164 than possible with surface modifying agents 144 of process 140.

Depending upon the complexity of modifications desired for the Janus particles 154, a plurality of processes 160 may be performed sequentially, with each process 160 specific for adding a particular chemical functionality to the surface of the Janus particles 154. Preferably, the modified Janus particles 166 are collected after each process 160 is completed. Any suitable collection process may be used for recovering the Janus particles 166, such as those described for process 130. The obtained Janus particles 166 may be extensively washed to remove solution 162, surface modifying agents 164, and any additional components 168.

The Janus angle of a colloidosome can be determined by removing at least a portion of the particles 104 from solid colloidosomes 126, imaging the resultant solid colloidosomes 126 with scanning electron microscopy (SEM), and measuring the three-phase contact angle of the voids left by the removed particles 104. A plurality of individual three-phase contact angles may be measured for one or more colloidosomes 126, and an averaged, three-phase contact angle determined by calculation.

The Janus balance may be determined by analyzing the Janus particles 154 or 166 themselves, such as by measuring the extent of surface modification achieved by a specific surface modifying agent during process 140.

One can infer the extent of particle coverage due to a surface modification on a particle having a known Janus balance. For example, a particle having a Janus balance of 35% that is subjected to surface modification with gold during process 140 refers to a particle having 65% of its surface covered with gold.

One possible explanation for the tunability of the Janus balance is that the surfactant 109 binds to the surface of the particles 104 and changes the surface hydrophobicity of the particles 104. With an apparent increase in surface hydrophobicity, the particles 104 can enter the first liquid 106 more deeply than if the surfactant 109 were omitted from the emulsion 112. Typically, the greater the hydrophobic character of the surfactant 109, the more deeply the particles 104 can enter the first liquid 106.

For particles 104 having a hydrophilic surface (for example, an ionic surface), the desired Janus balance can be achieved by altering the hydrophilic-hydrophobic composition of the particle surface with a hydrophobic surface modifying agent other than the surfactant 109. Janus particles of the desired Janus balance may be prepared by using pre-modified particles 104 in process 100, thereby eliminating the use of the surfactant 109 in the emulsion 112.

Figure 9:
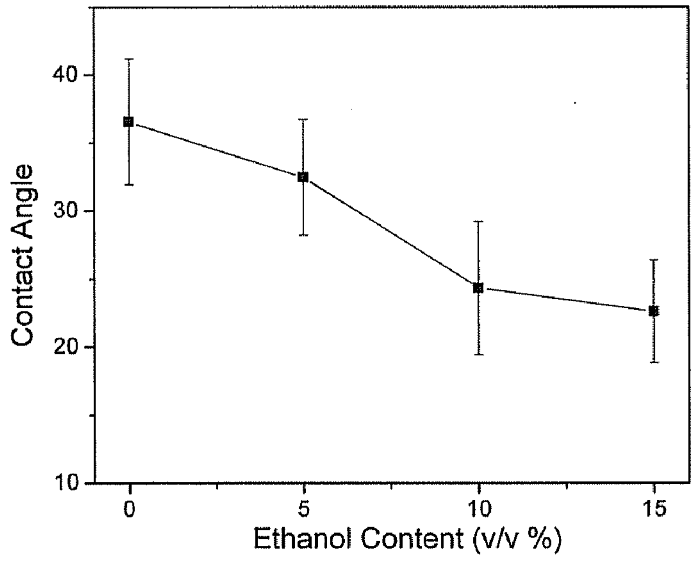
FIG. 9 depicts the relationship between the Janus angle and the concentration of ethanol relative to the water phase.
Figure 10:
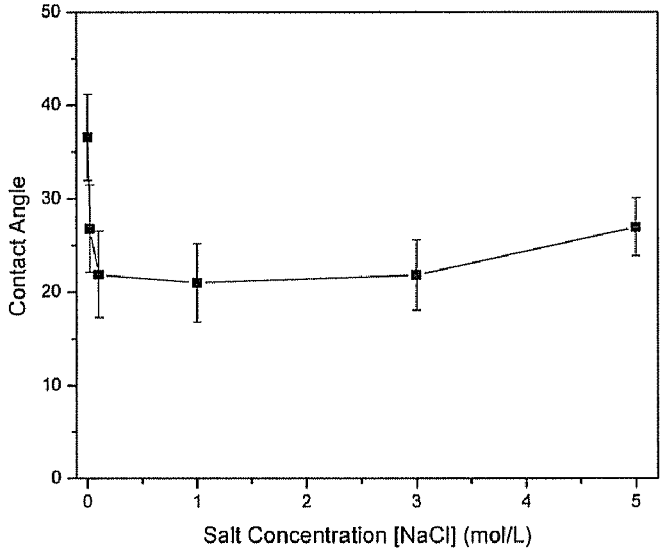
FIG. 10 depicts the relationship between the Janus angle and the concentration of salt relative to the water phase.
Figure 11:
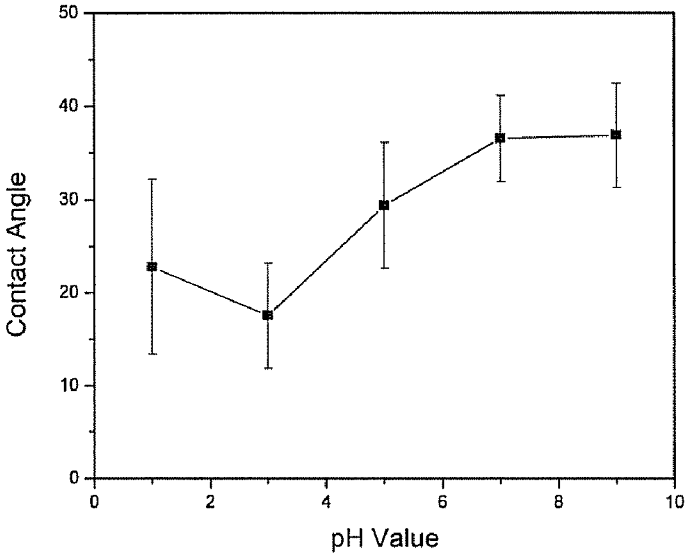
FIG. 11 depicts the relationship between the Janus angle and the pH value.

Besides the use of a surfactant 109 in process 100, Janus particles having a desired Janus balance may be prepared by modifying the pH and ionic strength of emulsion 112. For example, Janus particles having a desired Janus balance may be prepared with an emulsion 112 containing a liquid 108 (for example, water) having the pH adjusted to a specific pH (pH 1-11) or having a specific ionic strength (adjusted through inclusion of 0-5 M monovalent salt in liquid 108, such as NaCl or KCl). FIGS. 10 and 11 illustrate the effects of ionic strength and pH, respectively. Additionally, inclusion of an alcohol, such as ethanol, to a volume fraction of 0-15% of liquid 108 (for example, water), including a volume fraction of 1%, 2.5%, 5%, 7.5%, 10%, 12.5%, and 15% (as well as other percentages within that range), may be used in process 100 to fine tune the Janus balance of the resultant Janus particles. FIG. 9 illustrates the effect of alcohol. One possible explanation for the tunability of the Janus balance with these different conditions (inclusion of surfactant 109 or alcohol, or adjustment of the pH or ionic strength) is that each condition varies the surface tension of the liquid 108 in emulsion 106.

Process 100 can provide a dramatic improvement in the yield of Janus particles obtained when compared to traditional synthetic methods that use two-dimensional monolayers. For example, process 100 can provide Janus particle yields that are about two orders of magnitude greater than possible with traditional methods. Furthermore, the inclusion of a surfactant 109 in the emulsion 112 can result in improved synthetic yield of Janus particles. For example, inclusion of the cationic surfactant DDAB in an emulsion 112 containing fused silica microspheres resulted in a yield of 80% of Janus particles, as compared to a yield of 50% of Janus particles when the surfactant 109 was omitted.

One possible explanation for the improved yield is that the inclusion of a surfactant 109, particularly an ionic surfactant having a charge that is opposite to that of particles 104, may reduce electrostatic charge repulsion between particles 104. The resultant particles 104 may pack more efficiently at the interface 114 of colloidosome 116 and on the surface of solid colloidosome 126. A more efficient packing geometry for particles 104 may yield more robust colloidosomes 126 that contain or retain a greater number of particles 104 for subsequent modification.

Figure 12:
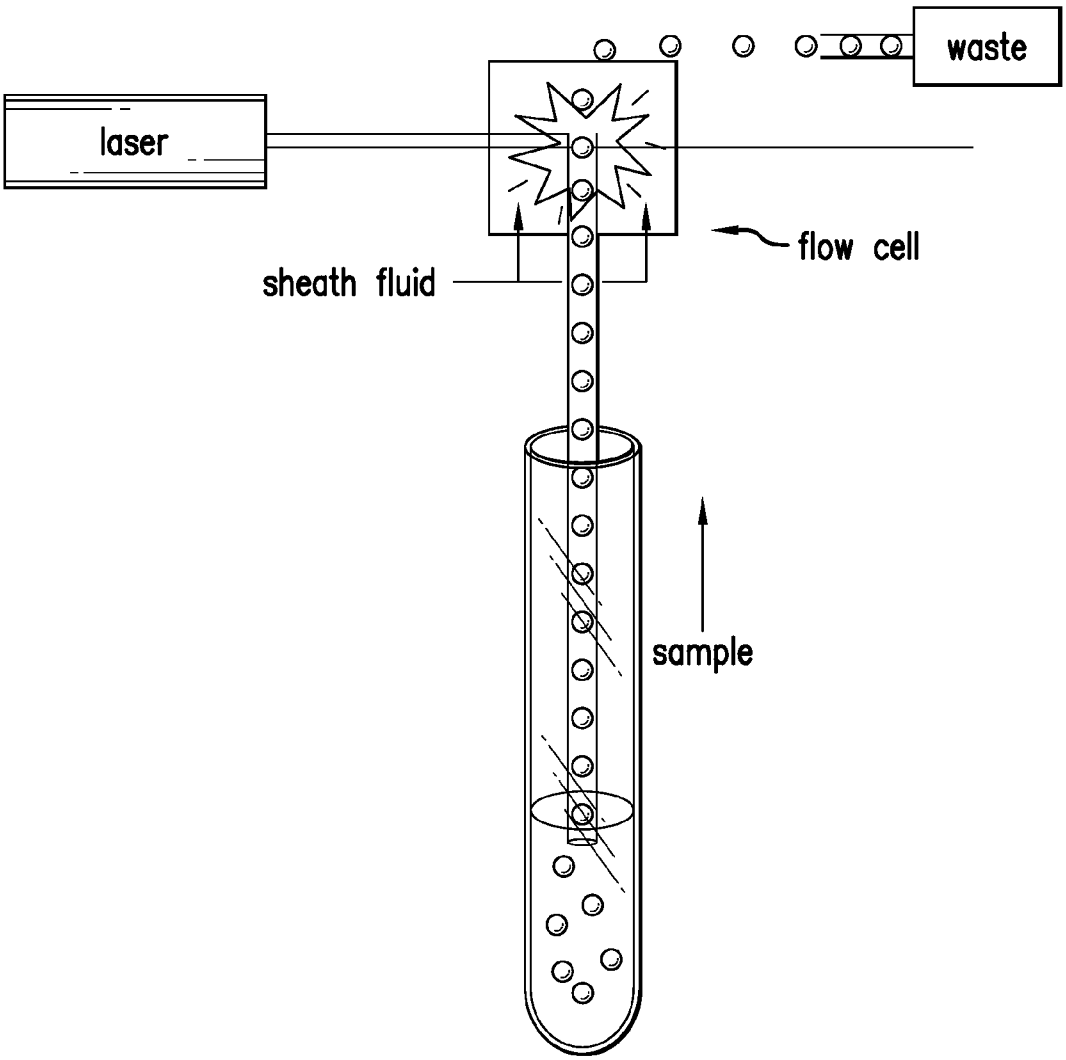
FIG. 12 illustrates a flow cytometry setup.
Figure 13:
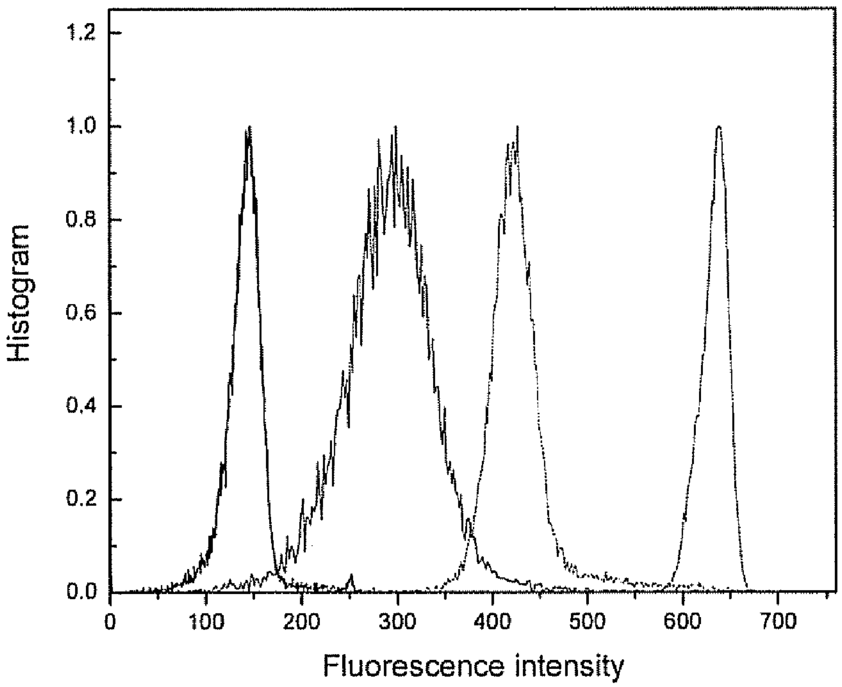
FIG. 13 depicts the distribution of particles, as analyzed by flow cytometry.

In addition to improved Janus particle yield, the purity of the Janus particles produced with process 100 is increased relative to Janus particles obtained with traditional methods. For example, analysis of the Janus particles made according to process 100 by flow cytometry indicates that the particles are uniform in composition and possess the expected surface coverage. FIG. 12 illustrates the flow cytometry setup. FIG. 13 show the distribution of particles analyzed by flow cytometry. In FIG. 13, dark area represents the area with lower fluorescence intensity; from left to right, the particles are: (1) homogeneous particles, which were modified by DCDMS first, then were labeled by APS-FITC; (2) Janus particles, the exposed area on the colloidosome was DCDMS modified first, and then inside was labeled by APS-FITC; (3) Janus particles, the exposed area on the colloidosome was labeled directly by APS-FITC; (4) homogeneous particles, which were labeled directly by APS-FITC.

Figure 3:
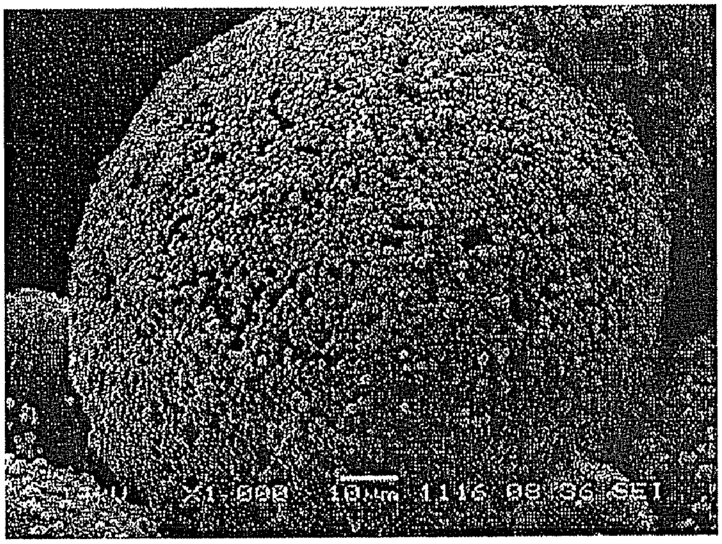
FIG. 3A depicts a scanning electron micrograph image of particles adsorbed onto the surface of a solidified colloidosome.
FIG. 3B depicts a scanning electron micrograph image of a broken solidified colloidosome.
Figure 3:

FIGS. 3A and 3B show SEM images of illustrative solid colloidosomes prepared according to process 120. The particles 104 were adsorbed on the surfaces of the solid colloidosomes 126. When emulsion 112 was cooled to a temperature below the melting temperature of the first liquid 106 (paraffin wax), the particle 104 monolayer surface coverage remained high (FIG. 3A). When the first liquid 106 solidified as a wax, particles 104 were locked in place and ceased to rotate. An examination of broken wax emulsions showed that >99% of the particles were located at the emulsion surface (FIG. 3B), having been adsorbed to this surface from prior dispersion in the wax phase.

The solid colloidosomes 126 of FIGS. 3A and 3B survived multiple washings, suggesting good mechanical stability. Nearly all particles 104 continued to remain at the surface, indicating fairly strong adsorption between particles 104 and the solid interior 124. Strong particle-colloidosome surface adsorption provided the feasibility for performing sequential chemical modifications on these adsorbed particle surfaces according to process 140.

The examples provide illustrations of the types of Janus particles that may be fabricated according to process 100, including bipolar particles (cationic on one side and anionic on the other side) and colloidal surfactants (charged on one side and hydrophobic on the other). However, an expansive variety of Janus particles are possible, being limited only by the types of particles 104 that may be used to form the colloidosomes 116 and 126 (including use of pre-modified particles), the efficiency whereby solid colloidosomes 126 are formed, and the compatibility of the particle modification chemistries possible for both the solid colloidosomes 126 and released Janus particles 154.

Figure 4:
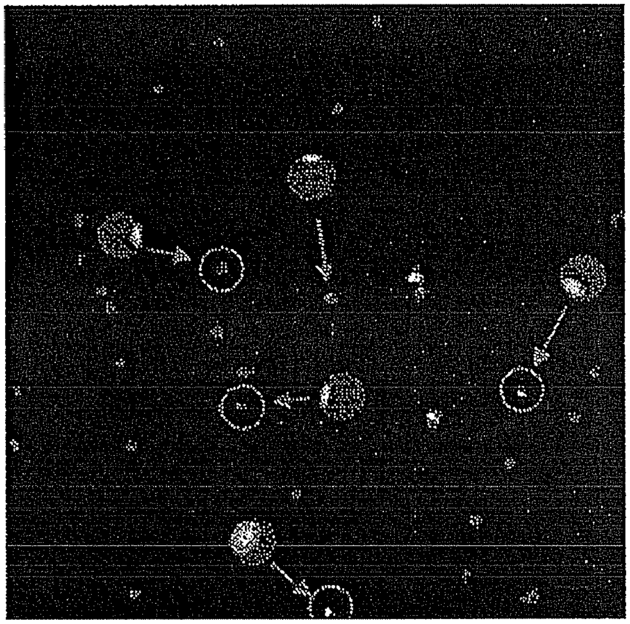
FIG. 4A depicts an epifluorescent image of Janus particles modified with a rhodamine B isothiocyanate group.
FIG. 4B depicts a time-dependent rotation of epifluorescent images of the particles of FIG. 4A.
Figure 4:
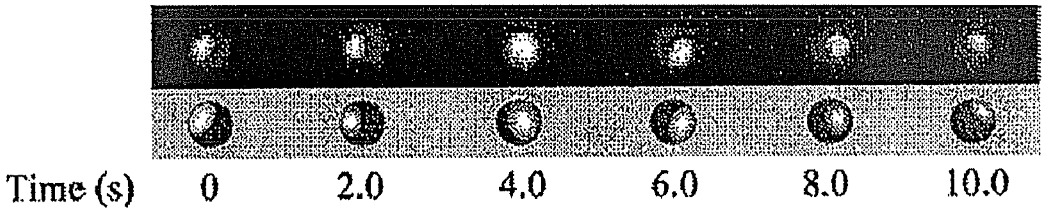

The efficacy of Janus particle surface chemical modification was confirmed by demonstrating that only one side of the particles was fluorescent following chemical modification of a solid colloidosome 126 with a fluorescent label. FIG. 4A shows a time sequence of epifluorescence images that illustrates that the bipolar particles rotate in an aqueous suspension, consistent with the Janus particles having only one fluorescent side. The silica particles are opaque, and because of the asymmetric coating by the dye, the particles display fluorescence having an intensity that differs according to their orientation with respect to the illumination direction. FIG. 4B illustrates a sequence of snapshots for one typical particle that tracks the particle's rotation, by Brownian motion, to different orientations.

Figure 5:
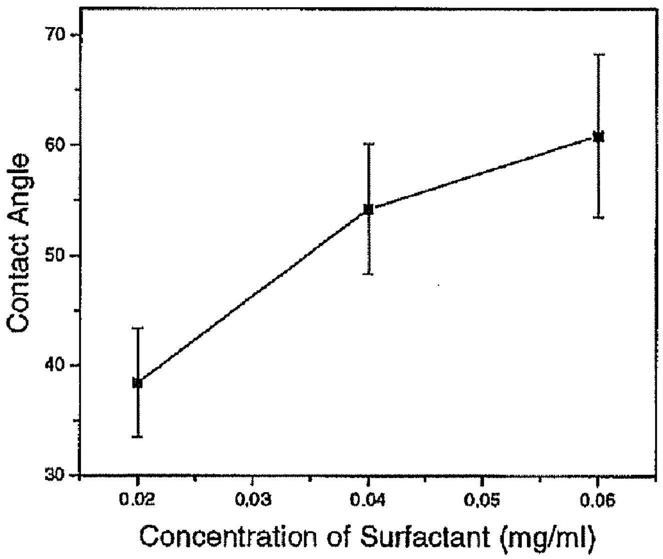
FIG. 5A depicts the relationship between the Janus angle and the concentration of a cationic surfactant (DDAB)
FIG. 5B depicts the relationship between the Janus angle and the concentration of a non-ionic surfactant (Tween 20)
Figure 5:
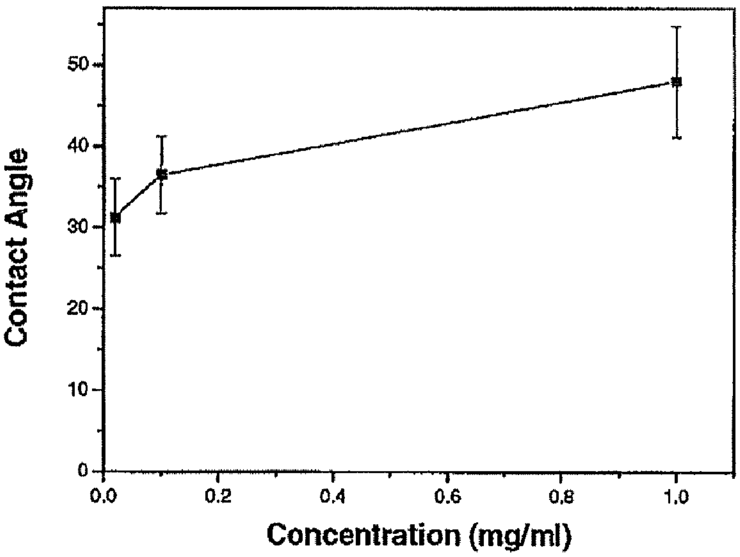
Figure 8:
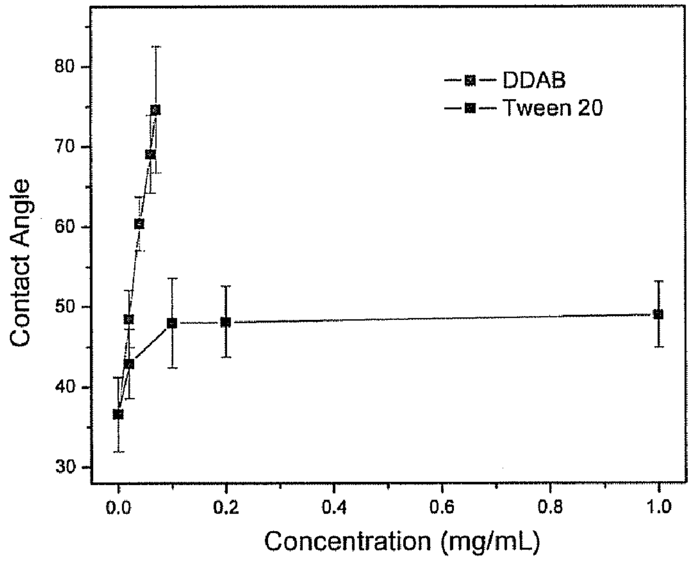
FIG. 8 depicts the relationship between the Janus angle and the concentration of surfactant (DDAB and Tween 20)

The control of the Janus angle was confirmed by analyzing the three-phase angle of voids left by the escaped particles 104 in colloidosomes 126. With the inclusion of a cationic surfactant in the emulsion 112 (for example, 20 mg/L to 60 mg/L of DDAB in water), the Janus angle was varied from 35 degrees to 70 degrees (FIG. 5A). With the inclusion of a non-ionic surfactant in the emulsion 112 (for example, 20 mg/L to 1 mg/ml of Tween 20 in water), the Janus angle was varied from about 30 degrees to about 55 degrees (FIG. 5B). Thus, the type of surfactant included in the emulsion 112 can influence the Janus angle of the formed colloidosomes and the Janus balance of the resultant Janus particles. FIG. 8 shows the data of FIGS. 5A and % B on a single graph.

Other methods for production of patchy particles may be used as would be apparent to those skilled in the art, depending for example on the size, shape and type of patchy particle desired for use in the chromatography devices and methods herein.

For example, microfluidic methods can be used to produce large quantities of particles, but the particle size obtained by such methods is presently limited to about 10 to 100 μm diameter (Nie et al., J. Am. Chem. Soc. 2006, 128, 9408; Nisisako et al., AdV. Mater. 2006, 18, 1152; Dendukuri et al., Nat. Mater. 2006, 5, 365). Another current approach to produce patchy particles, such as Janus particles, combines two different materials (Erhardt et al., Macromolecules 2001, 34, 1069; Roh et al., J. Nat. Mater. 2005, 4, 759). Although the shape and monodispersity characteristics of the resulting particles may be difficult to control using such methods, it is contemplated that patchy particles in accordance herewith may be formed using two or more different materials.

In another approach, homogeneous precursor particles may be modified selectively by a protect-and-release process. This process uses a planar solid substrate as a protecting surface onto which particles are initially placed as a two-dimensional monolayer. The side of the particle that faces the solid substrate is protected, while the other side of the particle is unprotected and can undergo chemical modification. Sputtering (Takei et al., Langmuir 1997, 13, 1865; Lu et al., J. Am. Chem. Soc. 2003, 125, 12724), stamp coating (Cayre et al., J. Mater. Chem. 2003, 13, 2445; Paunov et al., J. AdV. Mater. 2004, 16, 788), and Langmuir-Blodgett-based methods (Fujimoto et al. Langmuir 1999, 15, 4630) have been used to chemically modify the unprotected side of the particle. This approach offers good control over the surface area that sustains chemical modification; however, only a few milligrams of particles are produced in one batch because the approach relies on modification of a two-dimensional monolayer.

Attempts to solve Janus particle synthesis problems have focused on solution-based methodologies. For example, discrete particles can be joined from two phases at a liquid-liquid interface to form heterodimers (Gu et al., J. Am. Chem. Soc. 2005, 127, 34). In another example, the addition of a small amount of water to a particle-in-oil dispersion can cause the particles to aggregate by capillary forces to form clusters, the exterior of which is accessible for chemical modification (Takahara et al., J. Am. Chem. Soc. 2005, 127, 6271). A problem with this approach however, is that adequate control of surface coverage of the resultant clusters is difficult to achieve, because the chemical process is subject to kinetic control.

The following examples are provided to further illustrate various non-limiting embodiments and techniques. It should be understood, however, that these examples are meant to be illustrative and do not limit the scope of the claims. As would be apparent to skilled artisans, many variations and modifications are intended to be encompassed within the spirit and scope of the present disclosure.

EXAMPLES

Fused silica particles used in Examples 1-4 were 800 nm and 1.5 um in diameter, obtained from Alfa Aesa and Tokuyama, respectively. The particle surfaces were prepared for subsequent chemical modification in the following manner. The particles were initially treated with a pirahna solution, followed by recovery of the particles by centrifugation and drying at 80° C. under vacuum. The paraffin wax used in these experiments had a melting point of about 55° C. Both (aminopropyl)triethoxysilane (APS) (99%) and n-octadecanetrichlorosilane (OTS) were purchased from Aldrich. To produce fluorescent-labeled APS, rhodamine B isothiocyanate was attached to APS using a procedure described in the literature. Before OTS was used in these experiments, it was freshly purified by distilling it under vacuum.

Example 1

Fabrication of Janus Particles

Fused silica particles (0.2 g) were dispersed homogeneously in paraffin wax (1 g) that was pre-heated at 75° C. The resultant suspension was then mixed with deionized water (10 g) that was pre-heated at 75° C. The emulsions were produced by subjecting the resultant mixture to magnetic stirring at 1600 rpm for 1 h. Upon cooling the emulsion to room temperature, the paraffin wax droplets of the emulsion became a solid.

Deionized water was used to wash the wax emulsions multiple times to remove particles in the aqueous solution as well as weakly attached particles. The resulting exposed surfaces of particles attached to the emulsions were allowed to react chemically with 2 mM labeled APS in methanol solution for 30 min. The reaction solutions were washed with methanol to remove excess silane.

The wax was dissolved in chloroform at room temperature to release the particles. The resulting particles were further modified chemically. For example, those particles that had been allowed to react with APS on one surface could be further allowed to react with OTS (on the second surface), producing particles that were cationic on the APS side and hydrophobic on the OTS side.

Example 2

Characterization of the Janus Particles

Scanning electron microscopy, SEM (JEOL 6060 LV), was used to image the emulsions. Prior to imaging, a thin layer of gold was evaporated onto them to render them electrically conductive, to avoid surface charging in the electron beam.

A combination of optical imaging and epifluorescence imaging techniques were used to determine chemical composition of the particles. Optical imaging was performed with a Zeiss Axiovert 200 microscope fitted with a 40× objective. For epifluorescence imaging, 532 nm illumination (a Nd:YAG laser) was used and the laser beam was focused at the back focal point of a 63× air objective. The fluorescence images were collected using this same objective and recorded using an electron multiplying CCD camera (Andor Ixon) after filtering out light from the excitation laser. Images of particle rotation were recorded with an exposure time of 0.1 s for 800 frames.

Example 3

Fabrication of Colloidosomes Having Janus Angles of 38+/−2 Degrees And 63+/−4 Degrees Janus particles were prepared according to Example 1 using mixtures that contain 1 mg/ml or 3 mg/ml of the cationic surfactant, DDAB, in the water phase. Following cooling of the emulsion to room temperature, the solid colloidosomes were collected by filtration, and washed extensively with methanol to remove the surfactant.

Figure 6:
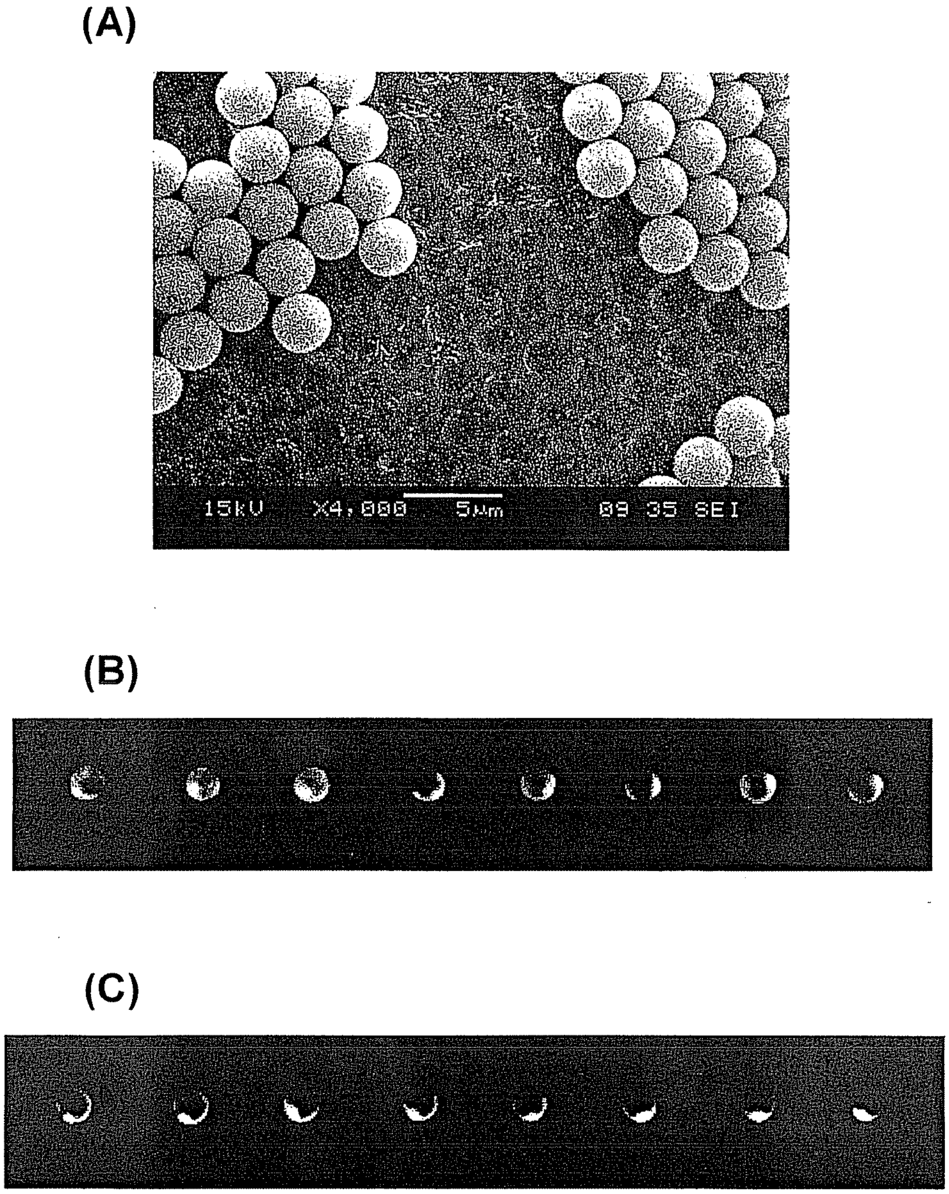
FIG. 6A depicts a scanning electron micrograph image of a solidified colloidosome surface formed in the presence of a cationic surfactant (DDAB) at a concentration of 1 mg DDAB in 50 ml of water (representing the second liquid)
FIGS. 6B and 6C depict time-dependent rotation of epifluorescent images of the Janus particles of the colloidosome of FIG. 6A after modification with a rhodamine B isothiocyanate group.
Figure 7:
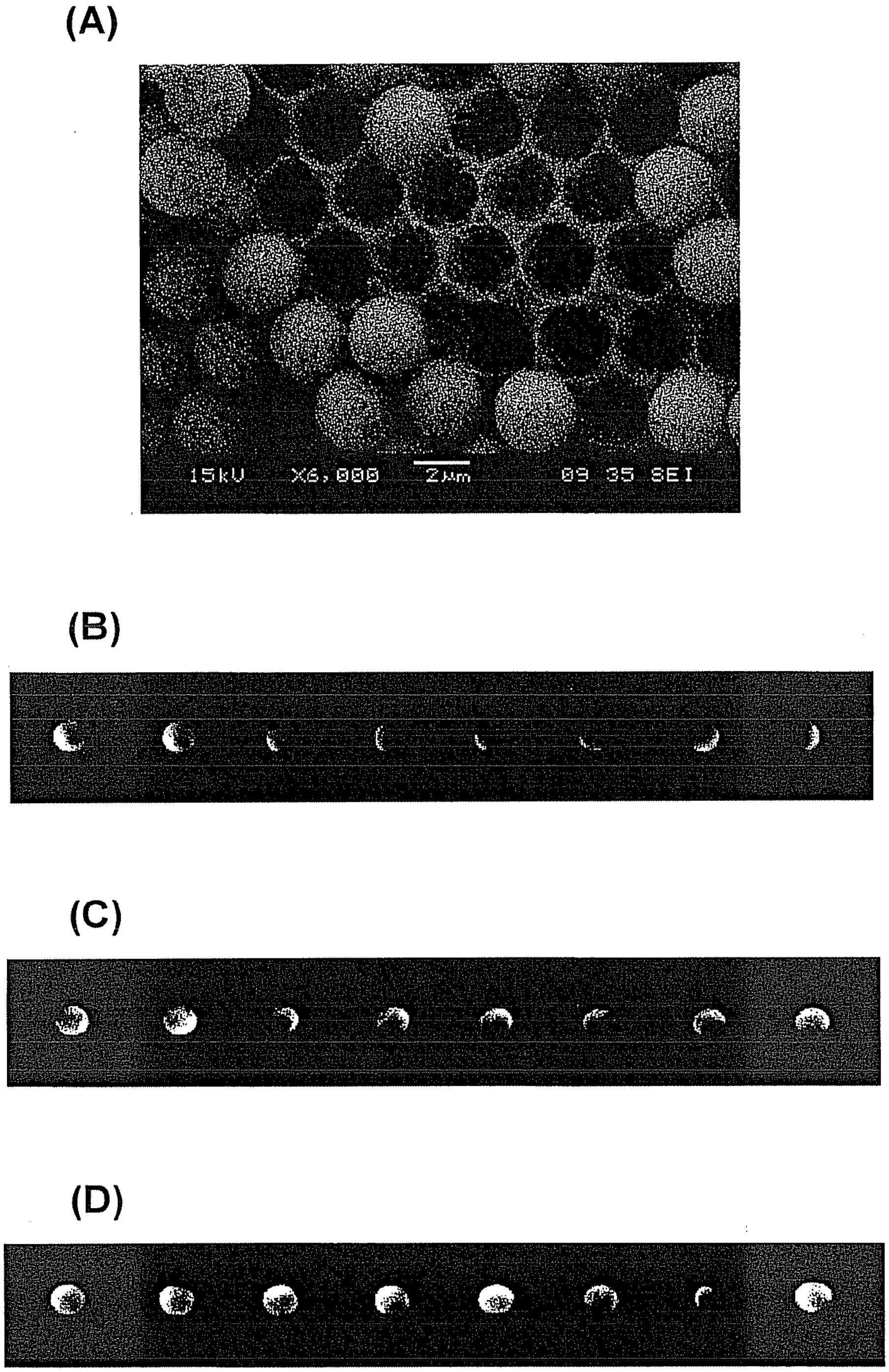
FIG. 7A depicts a scanning electron micrograph image of a solidified colloidosome surface formed in the presence of a cationic surfactant (DDAB) at a concentration of 3 mg DDAB in 50 ml of water (representing the second liquid)
FIGS. 7B, 7C, and 7D depict time-dependent rotation of epifluorescent images of Janus particles of the colloidosome of FIG. 7A after modification with a rhodamine B isothiocyanate group.

FIGS. 6A and 7A depict scanning electron microscopy images of the solid colloidosomes prior to chemical modification. Prior to imaging, a thin layer of gold was evaporated onto them to render them electrically conductive, to avoid surface charging in the electron beam.

The solid colloidosomes were chemically modified with APS and subsequently with rhodamine B isothiocyanate to produce fluorescent-labeled APS on one surface of the particles. The resultant Janus particles were recovered free of paraffin wax as described in Example 1. Time-dependent epifluorescence imaging was performed on the resultant Janus particles as described in Example 2. FIGS. 6B and 6C depict Janus particles released from colloidosomes having a Janus angle of 35 degrees and 36 degrees, respectively. FIGS. 7B, 7C, and 7D depict Janus particles released from colloidosomes having a Janus angle of 60 degrees, 59 degrees and 71 degrees, respectively.

Example 4

Fabrication of a Janus Protein Microparticle with a Gold Coating on One Surface (Prophetic Example)

BSA interacts very strongly with gold nanoparticles via its amine and thiol residues. Because of the presence of thiol and amine groups, the microparticle can be used as a template for the adhesion of gold nanoparticles. The gold colloid can adsorb directly onto the protein shell via interaction with thiol and amine groups. Thus, a Janus protein microparticle will be prepared having a gold coating on one side of the particle.

Air-filled microparticles 0.5 to 5 μm in diameter with a 50 Å thick protein shell will be initially prepared. The microparticles will be produced by sonicating a 5% weight per volume solution of bovine serum albumin (BSA) in water. The high-intensity ultrasound necessary for the reaction will be generated by a titanium horn with tip diameter of 0.5 inches, driven at 20 kHz. The BSA solution will be sonicated for 3 min at an acoustic power of 76 $W/cm^2$. The microparticle sizes will be generally under 5 μm. This size distribution should enable them to pass readily through the microcirculation.

The obtained protein microparticles (0.2 g) will be mixed with paraffin wax (1 g) (pre-heated at 75° C.) and water (10 g) (pre-heated at 75° C.) to form a mixture. An emulsion will be prepared by magnetically stirring the mixture at 1600× rpm for 1 hour. The emulsion will be cooled to room temperature to form a suspension of colloidosomes containing solidified wax and BSA microparticles embedded on the surface of the wax. The colloidosomes will be collected and washed, followed by incubation in an aqueous solution containing reduced chloroauric acid. The mixture will be shaken gently for 25 min, followed by collection of the colloidosomes. The colloidosomes may take on a reddish color; which is indicative that the gold particles had been transferred to the exposed microparticle surface of the colloidosomes. These colloidosomes will be collected by centrifugation, washed with water, and suspended in chloroform to dissolve the paraffin wax component of the colloidosome and to release the Janus particles. The Janus particles will be purified and analyzed for the presence of a gold coating on one surface.

Although the present disclosure has been described in example embodiments, additional modifications and variations would be apparent to those skilled in the art. For example, as discussed above, while Janus particles may be used in the present devices and methods, it is also envisioned that particles having three or more surfaces, each having a different coating or surface chemistry, may be used. The disclosure encompasses solid particles whose patchy chemical makeup differs in different spatial regions of the particle. Also, as discussed herein U.S. patent application Ser. No. 11/690,671, which is incorporated herein by reference, describes methods of producing, in controlled ways, particles having a patchy chemical makeup in which the particle surface is divided into two regions. Particles having three or more regions or patches (e.g., surfaces), can also be produced and find use in the devices and methods of the disclosure. Methods of producing such particles having three or more surfaces, each with a different coating or surface chemistry, may include for example, microfluidics, electrospinning, and novel emulsion polymerization processes.

It is therefore to be understood that the present disclosure herein may be practiced other than as specifically described. Thus, the present embodiments should be considered in all respects as illustrative and not restrictive. Accordingly, it is intended that such changes and modifications fall within the scope of the present disclosure as defined by the claims appended hereto.

What is claimed is:

1. A chromatography device comprising a stationary phase comprising a plurality of silica Janus particles, said silica Janus particles comprising at least a hydrophobic first surface coated with at least one alkyl chain, and a hydrophilic second surface having no coating thereon.

2. The chromatography device of claim 1, wherein the at least one alkyl chain is selected from the group consisting of: $C_4$, $C_8$ and $C_{18}$ alkyl chains.

3. The chromatography device of claim 1, wherein the chromatography device comprises a high performance liquid chromatography device.

4. The chromatography device of claim 1, wherein said silica Janus particles are colloidal-sized particles.

5. The chromatography device of claim 1, wherein said silica Janus particles comprise substantially spherical particles.

6. A chromatography device, comprising a stationary phase comprising a plurality of patchy particles, said patchy particles comprising at least a first surface and a second surface, the first surface having a different surface chemistry than the second surface.

7. The chromatography device of claim 6, wherein said first surface is a modified particle surface.

8. The chromatography device of claim 7, wherein said modified particle surface comprises a coating.

9. The chromatography device of claim 8, wherein said coating comprises at least one hydrophobic substance.

10. The chromatography device of claim 9, wherein said hydrophobic substance is an alkyl chain.

11. The chromatography device of claim 7, wherein said modified particle surface is a result of applying electromagnetic radiation to the first surface.

12. The chromatography device of claim 6, wherein said second surface is a modified particle surface.

13. The chromatography device of claim 6, wherein said second surface is an unmodified particle surface.

14. The chromatography device of claim 6, wherein said patchy particles comprise at least one material selected from the group consisting of polymers, polypeptides, proteins, nucleic acids, glass, ceramics, metals and chemical elements.

15. The chromatography device of claim 14, wherein said patchy particles comprise fused silica.

16. The chromatography device of claim 6, wherein said patchy particles comprise at least one shape selected from the group consisting of spherical, ellipsoid, rodlike, helical and oblate.

17. The chromatography device of claim 6, wherein said first surface is hydrophobic and said second surface is hydrophilic.

18. The chromatography device of claim 6, wherein said first surface comprises a positively charged 3-aminopropyltriethoxysilane (APS) and said second surface comprises non-polar octadecyltrichlorosilane (OTS).

19. The chromatography device of claim 6, wherein said chromatography device is capable of at least one chromatographic separation method selected from the group consisting of: normal phase liquid chromatography, reverse phase liquid chromatography, ion exchange chromatography, size exclusion, high performance liquid chromatography, and affinity chromatography.

20. The chromatography device of claim 6, wherein the plurality of patchy particles comprises a plurality of Janus particles.

21. A chromatography device, comprising a stationary phase comprising a plurality of patchy particles, said patchy particles comprising a plurality of surfaces, each surface having a different chemistry.

* * * * *